United States Patent [19]

Durantay et al.

[11] Patent Number: 6,107,705

[45] Date of Patent: Aug. 22, 2000

[54] METHOD OF REDUCING NOISE IN A ROTARY ELECTRIC MACHINE, ATTACHMENT APPARATUS FOR ATTACHING THE STATOR OF A ROTARY ELECTRIC MACHINE AND FOR IMPLEMENTING THE METHOD, AND A ROTARY ELECTRIC MACHINE PROVIDED WITH SUCH APPARATUS

[75] Inventors: Lionel Durantay, Saulxures les Nancy; Christophe Galmiche, Belfort, both of France

[73] Assignee: GEC Alsthom Moteurs SA, Nancy, France

[21] Appl. No.: 09/025,783

[22] Filed: Feb. 19, 1998

[30] Foreign Application Priority Data

Feb. 20, 1997 [FR] France .................................. 97 02009

[51] Int. Cl.$^7$ ...................................................... H02K 5/24
[52] U.S. Cl. .................................. 310/51; 310/89; 310/91
[58] Field of Search .................................. 310/51, 91, 89, 310/254

[56] References Cited

FOREIGN PATENT DOCUMENTS

| 1316344 | 12/1962 | France . |
| 879264 | 6/1953 | Germany . |
| 668815 | 3/1952 | United Kingdom . |

OTHER PUBLICATIONS

Patent Abstracts of Japan, vol. 017, No. 186(M–1395) dated Apr. 12, 1993 corresponding to JP 04 337114 A (Ebara Corp) dated Nov. 25, 1992.

Patent Abstracts of Japan, vol. 018, No. 389 (M–1642), Jul. 21, 1994 corresponding to JP 06 108698 A (Takenaka Komuten Co Ltd) dated Apr. 19, 1994.

*Primary Examiner*—Thomas M. Dougherty
*Assistant Examiner*—Burton S. Mullins
*Attorney, Agent, or Firm*—Sughrue, Mion, Zinn, Macpeak & Seas, PLLC

[57] ABSTRACT

The invention concerns attachment apparatus for a stator of a rotary electric machine, said machine comprising a rotor, a stator coaxial with the rotor, an airgap between the stator and the rotor, and a casing provided with attachment points for attaching the stator;

according to the invention, the attachment apparatus comprises attachment elements mounted between the attachment points and the stator;

each attachment element having an anisotropic stiffness comprising a tangential component Kt for taking up in part the static forces of the machine, and a radial component Kr for relieving in part the dynamic forces of the stator relative to the casing;

the resultant of the tangential components Kt taking up the static forces of the rotary electric machine with an axial displacement or a radial displacement of the stator that is less than or equal to a predetermined value that is less than the airgap; and the resultant of the radial components Kr relieves the dynamic forces of the stator with a predetermined coefficient of transmission to the casing.

3 Claims, 2 Drawing Sheets

$Kt \gg Kr$

METHOD OF REDUCING NOISE IN A ROTARY ELECTRIC MACHINE, ATTACHMENT APPARATUS FOR ATTACHING THE STATOR OF A ROTARY ELECTRIC MACHINE AND FOR IMPLEMENTING THE METHOD, AND A ROTARY ELECTRIC MACHINE PROVIDED WITH SUCH APPARATUS

The invention relates to a method of reducing noise and vibration in a rotary machine, to attachment apparatus for attaching the stator of rotary machine and for implementing the method, and to a rotary machine provided with such apparatus.

BACKGROUND OF THE INVENTION

One of the reasons for noise and vibration in rotary electric machines results from dynamic forces being transmitted from the stator to the casing in which it is mounted. Such dynamic forces, in particular of electromagnetic origin, appear as vibration starting on the bore radius of the stator. Such vibration is transmitted to the casing via the attachment points at which the stator is attached in the casing. The walls of the casing then act as an amplifier, and considerable acoustic noise and vibration ensues.

In one known configuration, the stator is suspended from metal beams themselves associated with the end plates of the rotary machine. As a result, the vibrating areas of the casing are limited. Unfortunately, that apparatus is limited in power because of the effects of the beams bending.

In another known configuration, the stator is attached to the casing by attachment systems of the metal shoe type. There too, the results as regards reducing acoustic noise and vibration are inadequate because of the isotropic nature of the metal shoes in terms of rigidity.

The inadequate results of those known techniques are due to the need to have considerable stiffness between the stator and the casing. It is necessary to have considerable rigidity between the stator and its supporting structure (the casing) in order to take up the static forces of the rotary electric machine so as to prevent major static eccentricity between the rotor and the stator. Such eccentricity increases the amplitudes of the dynamic and static excitation forces. Major eccentricity can give rise both to an increase in the amplitude of the vibration and to the stator sticking to the rotor.

Unfortunately, such necessarily high stiffness constitutes an excellent pathway to the casing for the noise-generating vibration.

OBJECTS AND SUMMARY OF THE INVENTION

An object of the present invention is to provide attachment apparatus for attaching the stator to the casing, which apparatus makes it possible to obtain a rotary machine that vibrates significantly less and that is significantly quieter than in the prior art.

To this end, the Applicant's research work has been based on studying the static forces and the dynamic forces of the stator, and on the rheology of the material used to attach the stator to the casing.

The invention thus provides a method of reducing noise and vibration in a rotary electric machine comprising a rotor, a stator coaxial with the rotor, and a casing, the stator being attached to the casing at a number of discrete attachment points.

In this method:
the static forces of the rotary electric machine are computed;
the static rigidity is computed for each of the casing, the stator, and the rotor;
for each of the attachment points at which the stator is attached to the casing, and on the basis of the equilibrium position of the stator, the rotor, and the casing taken together, a tangential stiffness contribution at the attachment point is computed so that the resultant of the tangential stiffness contributions takes up the static forces of the rotary electric machine with an axial displacement or a radial displacement of the stator that is less than or equal to a predetermined value;
the dynamic forces of the stator are computed;
the dynamic rigidity is computed for each of the casing and the stator;
for each attachment point, a radial stiffness contribution is computed such that the resultant of the radial stiffness contributions relieves the dynamic forces of the stator with a predetermined coefficient of transmission to the casing;
for each attachment point, an attachment element is made for attaching the stator to the casing, the attachment element having an anisotropic stiffness that has a tangential component Kt equal to the tangential stiffness contribution computed for the attachment point in question, and a radial component Kr equal to the radial stiffness contribution computed for the attachment point in question; and
the stator is mounted in the casing so that it is suspended from the attachment points on the casing by the attachment elements.

The invention also provides attachment apparatus for a stator of a rotary electric machine, said machine comprising a rotor, a stator coaxial with the rotor, an airgap between the stator and the rotor, and a casing provided with attachment points for attaching the stator.

According to the invention, the attachment apparatus comprises attachment elements mounted between the attachment points and the stator.

Each attachment element has an anisotropic stiffness comprising a tangential component Kt for taking up in part the static forces of the machine, and a radial component Kr for relieving in part the dynamic forces of the stator relative to the casing.

The combination of the tangential components Kt takes up the static forces of the rotary electric machine with an axial displacement or a radial displacement of the stator that is less than or equal to a predetermined value that is less than the airgap.

The combination of the radial components Kr relieves the dynamic forces of the stator with a predetermined coefficient of transmission to the casing.

The invention also provides a rotary electric machine having a suspended stator and including attachment apparatus as described above.

The anisotropic nature of the attachment elements makes it possible for the stator to be supported correctly (high tangential stiffnesses against the static forces) and for the vibration emitted by the dynamic forces of the stator to be effectively absorbed radially (low radial stiffnesses).

BRIEF DESCRIPTION OF THE DRAWINGS

Other advantages and characteristics of the present invention appear from the following description given with reference to the accompanying drawings, in which.

MORE DETAILED DESCRIPTION

Figure 1:
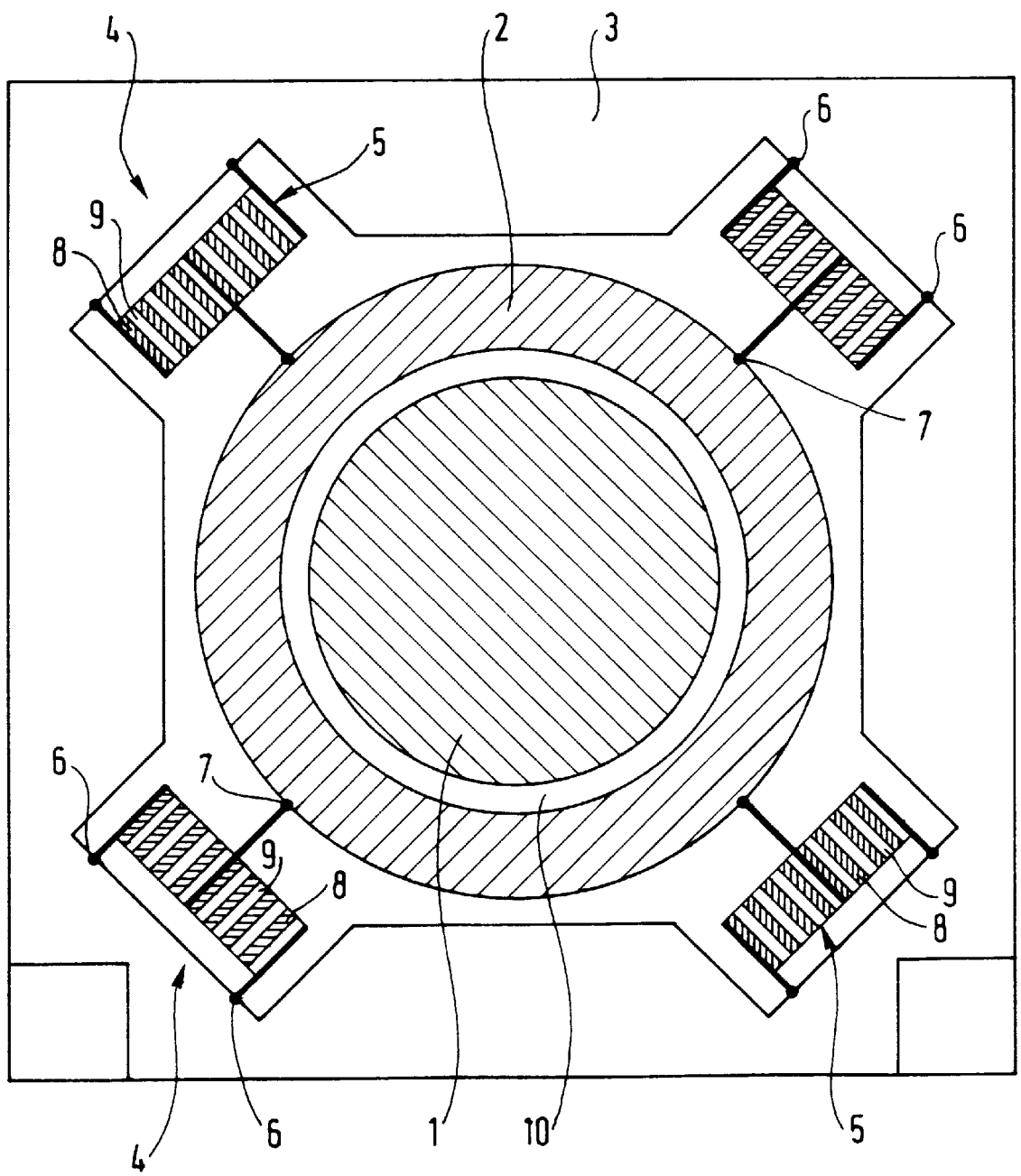
FIG. 1 is a diagrammatic cross-section view of a machine of the invention.
Figure 2:
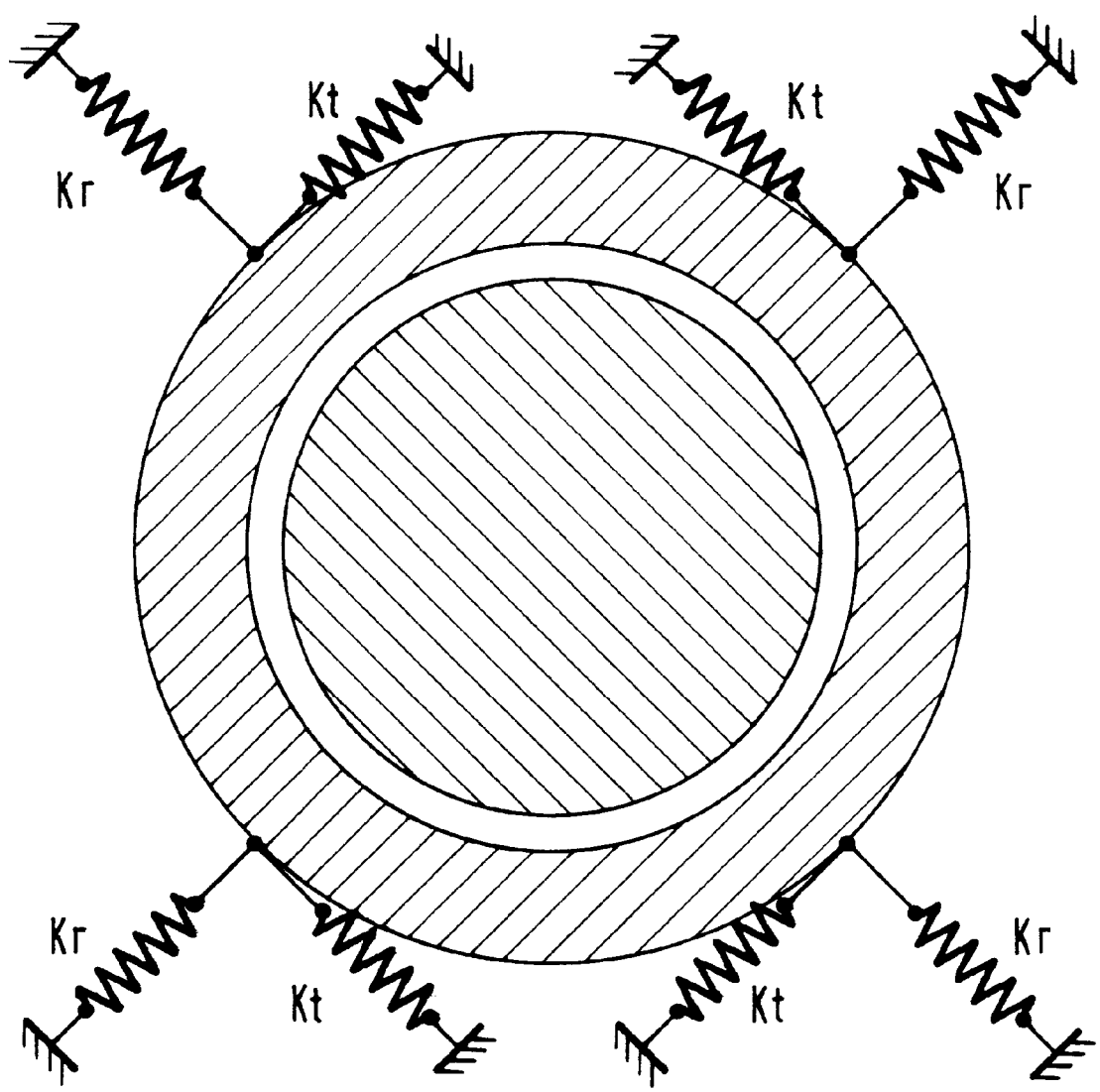
FIG. 2 is a view of FIG. 1 in which the attachment elements have been replaced by their equivalent springs.

The static forces of the stator are mainly the weight of the stator itself, the static magnetic attraction between the stator and the rotor, the reaction electromagnetic torque (counter-reaction of the stator when the rotor rotates), the inertia forces induced on the stator by the rotary machine being displaced (on-board rotary machine, traction motor, earthquake, etc.).

These static forces cause the stator to move off center relative to the rotor. Therefore, in the direction of the resultant of these forces, the stiffness of the attachment apparatus must be high so as to limit eccentricity. This may be achieved with a combination of high tangential stiffnesses at the points of attachment of the stator.

In addition, the dynamic forces of the stator, which forces are the main cause of casing vibration and of noise, give rise to deformations of the radial breathing type or the radial lobe type. It is thus necessary for the stiffness of the attachment apparatus in the radial directions to be such that it makes it possible for vibration to be absorbed to a large extent.

This can be achieved by low radial stiffnesses at the attachment points.

The present invention relates firstly to a method of reducing vibration and noise in a rotary electric machine comprising a rotor 1, a stator 2 coaxial with the rotor 1, and a casing 3, the stator 2 being attached to the casing 3 at a number of discrete attachment points 4.

In this method:

The static forces of the rotary electric machine are computed. These forces mainly include the weight of the stator 2 itself, the static magnetic attraction between the stator 2 and the rotor 1, the reaction electromagnetic torque (counter-reaction of the stator 2 when the rotor 1 rotates), the inertia forces induced on the stator 2 by the rotary machine being displaced (on-board rotary machine, traction motor, etc.).

This computation may be performed for various configurations of the rotary electric machine, e.g.:

with nominal loading;

with loading under start-up torque;

with loading under short-circuit torque; and with loading under the effect of inertia force (earthquake).

For each of the attachment points at which the stator 2 is attached to the casing 3, a tangential stiffness contribution Kt at the attachment point 4 is computed so that the resultant of the tangential stiffness contributions takes up the static forces of the rotary electric machine with an axial displacement or a radial displacement of the stator that is less than or equal to a predetermined value. The axial displacements or the radial displacements are predetermined as a function of the configuration. For example, 10% of the airgap 10 for nominal loading, 15% of the airgap 10 for the start-up torque, etc.

The dynamic forces of the stator 2 are computed. These are the forces created in the stator 2 while the machine is operating.

The dynamic rigidity is computed for each of the casing and the stator 3.

For each attachment point 4, a radial stiffness contribution Kr is computed such that the resultant of the radial stiffness contributions relieves the dynamic forces of the stator 2 with a predetermined coefficient of transmission to the casing 3.

For each attachment point 4, an attachment element 5 having an anisotropic stiffness is made for attaching the stator 2 to the casing 3.

This anisotropic stiffness includes firstly a tangential component Kt equal to the tangential stiffness contribution computed for the attachment point 5 in question, and for a given safety margin regardless of the configuration, and secondly, a radial component Kr equal to the radial stiffness contribution computed for the attachment point 5 in question.

In a last step, the stator 2 is mounted in the casing 3 so that it is suspended from the attachment points 4 on the casing 3 by the resulting attachment elements 5.

The invention also concerns attachment apparatus for a stator 2 of a rotary electric machine, said machine comprising a rotor 1, a stator 2 coaxial with the rotor 1, an airgap 10 between the stator 2 and the rotor 1, and a casing 3 provided with attachment points 4 for attaching the stator 2.

The attachment apparatus comprises attachment elements 5 mounted between the attachment points 5 and the stator 2.

Each attachment element 5 has an anisotropic stiffness comprising a tangential component Kt for taking up in part the static forces of the machine, and a radial component Kr for relieving in part the dynamic forces of the stator relative to the casing.

The resultant of the tangential components Kt takes up the static forces of the rotary electric machine with an axial displacement or a radial displacement of the stator that is less than or equal to a predetermined value that is less than the airgap; and the resultant of the radial components Kr relieves the dynamic forces of the stator with a predetermined coefficient of transmission to the casing.

In one embodiment, the attachment elements 5 are made of an elastomer laminated composite made up of an alternating stack of steel plates 8 and of elastomer layers 9. Because of its structure, the laminated composite has a stiffness in the direction of the stack (traction/compression) that is much greater than its stiffness in a perpendicular direction (shearing).

In the embodiment shown in FIG. 1, the apparatus comprises eight attachment elements uniformly distributed in fours in two transverse planes (only one plane being shown) at 45°, 135°, 225°, and 315°.

Each attachment element 5 is provided with two end points 6 for mounting on the casing 3 and a midpoint 7 for mounting on the stator 2. The direction of the stack is parallel to the tangent to the stator 2 at the mounting midpoint 7. In this way, each attachment element 5 has a stiffness Kr that is low radially (shear) and a stiffness Kt that is high tangentially (traction/compression).

Naturally, the apparatus may be optimized so as to reduce the number of attachment elements. At the least, only three attachment elements are necessary for the entire stator.

The invention also concerns a rotary electric machine provided with attachment apparatus of the invention.

Naturally, the invention is not limited to the described implementation or embodiment, but rather numerous variants are possible that are accessible to a person skilled in the art without going beyond the invention. In particular, the shapes, the number, and the disposition of the attachment elements can vary without going beyond the ambit of the present invention. Similarly, the configurations for computing the static forces or the dynamic forces of the rotary machine can be changed without going beyond the ambit of the present invention.

What is claimed is:

1. A rotary electric machine comprising:

a rotor;

a stator coaxial with the rotor and an airgap between the stator and the rotor;

a casing provided with attachment points for attaching the stator; and attachment elements mounted between the attachment points and the stator;

each attachment element having an anisotropic stiffness comprising a tangential component Kt for taking up in part the static forces of the machine and a radial component Kr for dissipating in part the dynamic forces of the stator relative to the casing;

the resultant of the tangential components Kt taking up the static forces of the rotary electric machine with an axial displacement or a radial displacement of the stator that is less than or equal to a predetermined value that is less than the airgap; and the resultant of the radial components Kr dissipates the dynamic forces of the stator with a predetermined coefficient of transmission to the casing; and wherein the attachment elements are made of an elastomer and steel laminated stack composite disposed between the stator and the casing, the stacking direction for each attachment element being parallel to a tangent to the stator at a corresponding attachment point at which the stator is attached, each attachment element having two end points for attaching to the casing and a midpoint for attaching to the stator.

2. An attachment apparatus for a stator of a rotary electric machine, said machine comprising a rotor, a stator coaxial with the rotor, an airgap between the stator and the rotor, and a casing provided with attachment points for attaching the stator;

the attachment apparatus comprising attachment elements mounted between the attachment points and the stator;

each attachment element having an anisotropic stiffness comprising a tangential component Kt for taking up in part the static forces of the machine, and a radial component Kr for dissipating in part the dynamic forces of the stator relative to the casing;

the resultant of the tangential components Kt taking up the static forces of the rotary electric machine with an axial displacement or a radial displacement of the stator that is less than or equal to a predetermined value that is less than the airgap; and the resultant of the radial components Kr dissipates the dynamic forces of the stator with a predetermined coefficient of transmission to the casing; and wherein the attachment elements are made of an elastomer and steel laminated stack composite disposed between the stator and the casing, the stacking direction for each attachment element being parallel to a tangent to the stator at a corresponding attachment point at which the stator is attached, each attachment element having two end points for attaching to the casing and a midpoint for attaching to the stator.

3. An attachment apparatus for a stator of a rotary electric machine, said machine comprising a rotor, a stator coaxial with the rotor, an airgap between the stator and the rotor, and a casing provided with attachment points for attaching the stator;

the attachment apparatus comprising attachment elements mounted between the attachment points and the stator;

each attachment element having an anisotropic stiffness comprising a tangential component Kt for taking up in part the static forces of the machine, and a radial component Kr for dissipating in part the dynamic forces of the stator relative to the casing;

the resultant of the tangential components Kt taking up the static forces of the rotary electric machine with an axial displacement or a radial displacement of the stator that is less than or equal to a predetermined value that is less than the airgap; and the resultant of the radial components Kr dissipates the dynamic forces of the stator with a predetermined coefficient of transmission to the casing; and wherein the attachment elements are made of an elastomer and non-elastomer laminated stack composite disposed between the stator and the casing, the stacking direction for each attachment element being parallel to a tangent to the stator at a corresponding attachment point at which the stator is attached, each attachment element having two end points for attaching to the casing and a midpoint for attaching to the stator.

* * * * *